Figure 1:
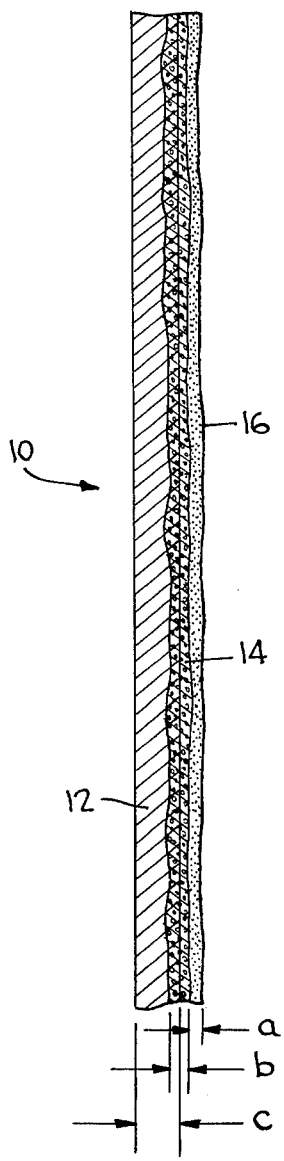

United States Patent [19]

Dews et al.

[11] 3,912,538
[45] Oct. 14, 1975

[54] NOVEL COMPOSITE FUEL CELL ELECTRODE

[75] Inventors: George H. Dews, Glastonbury; Fred S. Kemp, Rockville, both of Conn.

[73] Assignee: United Technologies Corporation, Hartford, Conn.

[22] Filed: Jan. 15, 1974

[21] Appl. No.: 433,447

[52] U.S. Cl. .......................... 136/86 D; 136/120 FC
[51] Int. Cl. .......................................... H01m 27/04
[58] Field of Search ..................... 136/86 D, 120 FC

[56] References Cited
UNITED STATES PATENTS

| | | | |
|---|---|---|---|
| 3,400,019 | 9/1968 | LeDuc | 136/120 FC |
| 3,403,057 | 9/1968 | Stanbavich et al. | 136/120 FC |
| 3,556,856 | 1/1971 | Elbert | 136/120 FC |
| 3,600,230 | 8/1971 | Stachurski et al. | 136/120 FC |

Primary Examiner—John H. Mack
Assistant Examiner—H. A. Feeley
Attorney, Agent, or Firm—A. W. Breiner

[57] ABSTRACT

A fuel cell electrode comprising a continuous carbon fiber substrate, a graphite-hydrophobic polymer sublayer partially impregnated into said fiber substrate, and a catalyst-hydrophobic polymer layer on said sublayer. The electrode has good chemical stability and electrical conductivity; permits excellent control of the reaction interface of the electrode; and permits a low-catalyst loading, providing a relatively inexpensive electrode.

7 Claims, 2 Drawing Figures

U.S. Patent  Oct. 14, 1975  3,912,538

NOVEL COMPOSITE FUEL CELL ELECTRODE

FIELD OF INVENTION AND BACKGROUND

This invention relates to improved fuel cells and, more particularly, to the construction of low-thickness, lightweight electrodes having high electrochemical activity while utilizing only relatively minor amounts of catalytic material. For convenience hereinafter, the electrodes will be described with emphasis being placed on the use of the electrodes in a fuel cell. It will be apparent, however, that the electrodes of the invention can be employed in other electrochemical devices where similar considerations apply.

Considerable attention has been directed to fuel cells and fuel cell components in recent years in an attempt to obtain improved sources of electrical energy. Essentially, a fuel cell is an electrochemical device in which part of the energy of a chemical reaction is converted directly into direct current electrical energy. One of the more significant advantages of fuel cells over conventional methods of generating electricity is the directness by which chemical energy is converted into electrical energy, eliminating the necessity of converting energy into heat, thereby avoiding the inefficiencies associated with the Carnot heat cycle. Other advantages include quietness, cleanliness, and the reduction, if not the complete elimination of moving parts.

In the construction of fuel cells it is necessary to stack a plurality of fuel cells together in electrical association in order to obtain the required current and voltage characteristics. To conserve space, cells have been constructed utilizing lightweight electrodes which are either positioned adjacent to an electrolyte matrix containing an aqueous electrolyte, or which define in part an electrolyte chamber for retaining a free-flowing liquid electrolyte. Reference is made, for example, to U.S. Pat. Nos. 3,419,900 and 3,276,909 for lightweight electrodes which have been found highly advantageous in fuel cell construction.

SUMMARY OF THE INVENTION

In accordance with the present invention, a lightweight electrode is provided comprising a continuous, hydrophilic carbon fiber substrate, a graphite-hydrophobic polymer sublayer partially impregnated into the fiber substrate, and a catalyst-hydrophobic polymer layer overlaying the graphite-hydrophobic polymer sublayer. The carbon fiber substrate which is hydrophilic permits the passage of an aqueous electrolyte into and through the substrate. The graphite-hydrophobic polymer sublayer is relatively hydrophobic, but yet contains sufficient porosity and a balance of hydrophobic-hydrophilic material to permit the passage of electrolyte to the catalyst-hydrophobic polymer layer where the electrochemical reaction of the fuel cell occurs. The sublayer over the substrate provides a partially wetproof and smooth, continuous base over the substrate for the catalyst layer which, as a result of the smooth continuous base, is formed as a thin, continuous, discrete layer, making efficient use of the catalyst contained therein. As is recognized in fuel cell technology, the catalyst utilized in a fuel cell electrode is the most expensive component of the fuel cell since, to date, the most efficient catalysts are the relatively scarce and, therefore, expensive metals, i.e., the Group VIII metals such as platinum, palladium, iridium, rhodium, and admixtures or alloys thereof.

Figure 2:
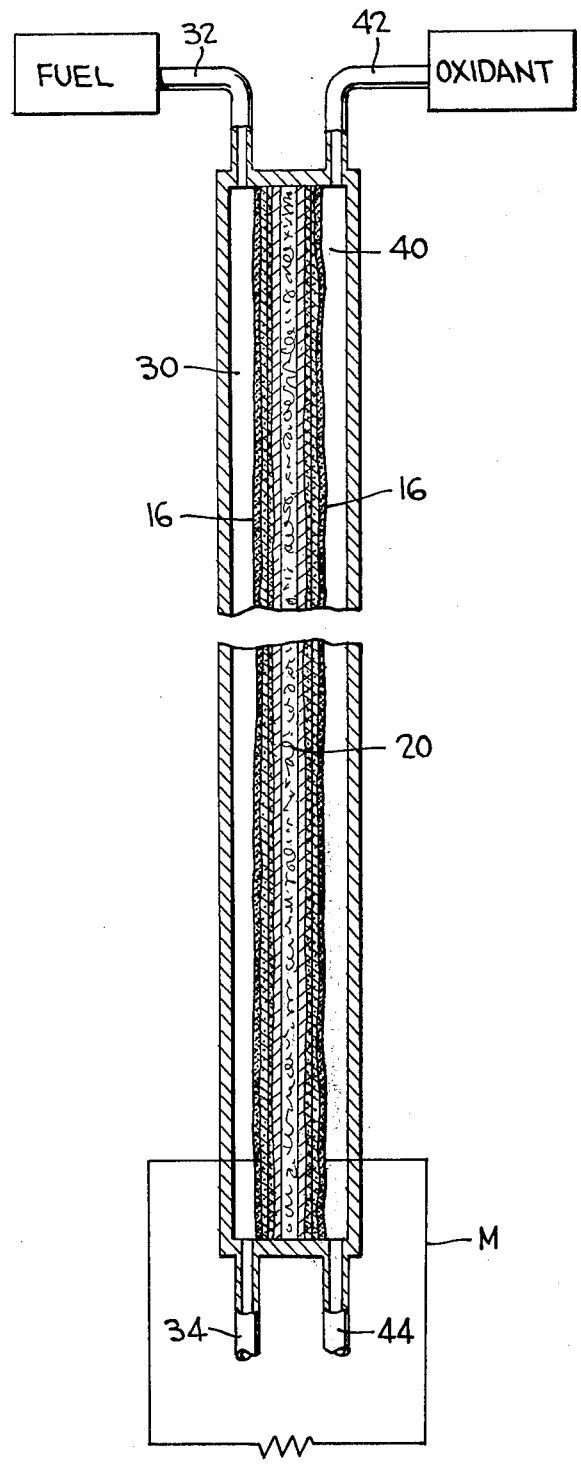

An electrode made in accordance with the present invention is illustrated in cross-section in FIG. 1 of the drawing. FIG. 2 is a fuel cell utilizing electrodes made in accordance with the present invention as both the cathode and anode of the cell, separated by an electrolyte matrix.

More specifically, referring to FIG. 1, an electrode 10 comprises a carbon fiber substrate 12 having a thickness $c$, and at one surface thereof a graphite-hydrophobic polymer sublayer 14 having a thickness $b$. As also seen from FIG. 1, sublayer $b$ enters into, or impregnates the surface of substrate 12. On top of the sublayer 14 is a catalyst layer 16 comprising an admixture of electrocatalyst and hydrophobic polymer having a thickness $a$. This catalyst layer formed on top of the sublayer 14 does not impregnate the sublayer to any substantial extent and, accordingly, forms as a thin, continuous, discrete layer upon the sublayer making most efficient use of catalyst.

As seen in FIG. 2, when the electrode of FIG. 1 is disposed in a fuel cell, the carbon-fiber substrate 12 is in contact with the electrolyte matrix 20 and the catalyst layer 16 is in contact with the oxidant and fuel compartment of the fuel cell. In operation, when an aqueous acid or alkaline electrolyte such as phosphoric acid or potassium hydroxide is impregnated into matrix 16, electrolyte will flow into substrate 12, partially into substrate layer 14, and into catalyst layer 16. When fuel, such as hydrogen, is fed into reactant compartment 30 through inlet 32 from a suitable storage container, and an oxidant is fed into compartment 40 through inlet 42 from a suitable storage container, an interface of electrolyte/catalyst/reactant is formed where an electrochemical reaction occurs. Electrical energy is withdrawn through electrical circuit M. Any excess fuel and oxidant is vented through fuel outlet 34 and oxidant outlet 44.

In the fabrication of electrodes according to the present invention, the sublayer and catalyst layer can be applied to the carbon fiber substrate by various techniques. A suspension of graphite and hydrophobic polymer can be made in an aqueous medium and the suspension applied by spraying, filtration techniques, or the suspension can be made into a paste and applied to the substrate by means of a doctor blade or the like. It is desirable, if not essential, that the suspension be sufficiently dilute to permit the impregnation of the suspension of graphite and polymer into at least the surface of the fiber substrate. The catalyst layer can be applied to the sublayer, again using various techniques including spraying or filtration techniques or as a semi-fluid paste.

In order to more fully define the invention, a preferred embodiment will be set forth.

A carbon fiber substrate is prepared for spray application of a graphite-hydrophobic polymer sublayer by taping the substrate to a hard, flat surface such as a glass, plastic, or metal plate. The carbon fiber substrate preferably is made from carbon fiber having a fiber thickness of 6 to 8 microns, with the fibers having a pyrolytic carbon coating of from 3 to 5 microns. The porosity of the paper is 70 to 75 percent, with the mean pore size being from 50 to 60 microns. The overall thickness of the carbon substrate is 10 to 15 mils, with the electrical resistivity being 0.2 to 0.3 ohms per inch. An aqueous suspension of graphite and hydrophobic polymer is prepared by mixing 50 percent graphite having a particle size of 5 to 6 microns and a surface area of from 8 to 9 square meters per gram, with 50 percent polytetrafluoroethylene having a particle size of 0.2 to 0.4 microns, said percentages being on a weight basis. The suspension is diluted to the consistency of a thin paint. The suspension is sprayed onto the exposed surface of the carbon fiber substrate with an artist's air brush gun. The spraying process is periodically interrupted to dry the paper with a hand-held hot-air gun, thereby preventing running and consequent maldistribution of the suspension onto the substrate. A sublayer having a thickness of from 3 to 5 mils is applied in approximately eight spray/dry cycles. Thereafter, the substrate and sublayer are vacuum dried at 350°F. for a period of 90 minutes to remove water and any wetting agent present in the graphite-PTFE suspension. A preferred suspension is duPont's TFE 30 which employs Triton X-100 wetting agent. After applying the sublayer, a catalyst layer is sprayed on top of the sublayer. The catalyst layer is applied by spraying and drying, in accordance with the aforesaid procedure, a suspension of platinum black and polytetrafluoroethylene, the ratio of platinum being sufficient to provide the necessary conductivity to the catalyst layer and the amount of polymer being sufficient to provide the necessary bonding and control of the reaction interface. Preferably, the catalyst will comprise from 15 to 80 volume percent of the catalyst layer. The electrode made in accordance with the present invention preferably has a substrate thickness, i.e., c of FIG. 1, of 15 mils; a sublayer thickness, i.e., b of FIG. 1, of approximately 3 mils; and a catalyst layer, i.e., a of FIG. 1, of 1 mil.

A comparison of an electrode made in accordance with the present invention and an identical electrode except for utilization of the hydrophobic sublayer is as follows:

|  | Air Cathode Performance | |
| --- | --- | --- |
|  | 100 ASF | 300 ASF |
| Electrode With Sublayer | 751 mv. | 620 mv. |
| Electrode Without Sublayer | 691 mv. | 572 mv. |

The aforesaid data was obtained in a fuel cell utilizing a 96 percent aqueous phosphoric acid electrolyte, the cell being maintained at a temperature of 275°F. using hydrogen and oxygen as the reactants.

In the above examples, the catalyst utilized in the catalyst layer can be replaced by other electrochemically active materials including silver, gold, palladium, ruthenium, rhodium, alloys thereof, and such electrocatalysts on a tungsten oxide base, as well as other elements which are electrochemically active. Moreover, the hydrophobic polymer of the substrate layer can be replaced by other polymers such as polytrifluorochloroethylene, polyvinylidenefluoride, polyethylene, and co-polymers thereof. Although the electrodes are particularly adapted for use with acid electrolytes such as phosphoric acid, sulfuric acid, and hydrochloric acid, the electrodes are suitable for use in alkaline cells, including cells employing the aqueous alkali hydroxides, alkaline earth hydroxides, carbonates, and the like. The electrolyte can be trapped or impregnated in a matrix material or it can be free-flowing. The thickness of the carbon fiber substrate layer while preferably in the range of about 5 to 10 mils, can be from 3 to 30 mils. The sublayer while preferably being from about 3 to 5 mils, can be from 2 to 25 mils. The catalyst layer is normally as thin as possible and preferably from 1 to 5 mils thick. The catalyst layer can, however, be substantially equal to the thickness of the sublayer. The proportions of catalyst and binder in the catalytic layer can be adjusted over a relatively large range, the essential thing being that there is sufficient metal in the catalyst layer to provide electrical conductivity and that there is sufficient polymer binder present to maintain the integrity of the electrode and control of the electrolyte interface. The graphite and carbon ratio in the sublayer again can vary over broad ranges, with it being essential, however, that the sublayer is relatively hydrophobic with respect to the carbon fiber substrate. Such embodiments being within the ability of one skilled in the art are covered by the appended claims.

It is claimed:

1. A trilayer electrode comprising a continuous carbon fiber substrate, a graphite-hydrophobic polymer sublayer partially impregnated into said fiber substrate, and a catalyst-hydrophobic polymer layer on said sublayer.

2. The electrode of claim 1 wherein the hydrophobic polymer is polytetrafluoroethylene.

3. The electrode of claim 2 wherein the carbon fiber substrate has a carbon fiber thickness of 6 to 8 microns, said fibers having a pyrolytic carbon coating thereon of from 3 to 5 microns.

4. The electrode of claim 3 wherein the substrate has a porosity of 70 to 75 percent, a mean pore size of 50 to 60 microns, an overall thickness of 10 to 15 mils, and an electrical resistivity of 0.2 to 0.3 ohms per inch.

5. The electrode of claim 2 wherein the graphite-polymer sublayer has a thickness of 3 to 5 mils.

6. The electrode of claim 5 wherein the catalyst layer is from 1 to 4 mils.

7. A fuel cell comprising an anode, cathode, and an electrolyte positioned between said anode and cathode, at least one of said anode and cathode being the electrode defined in claim 1.

* * * * *